J. BUTTNER.
NUT LOCK.
APPLICATION FILED JAN. 2, 1912.
1,022,657.
Patented Apr. 9, 1912.
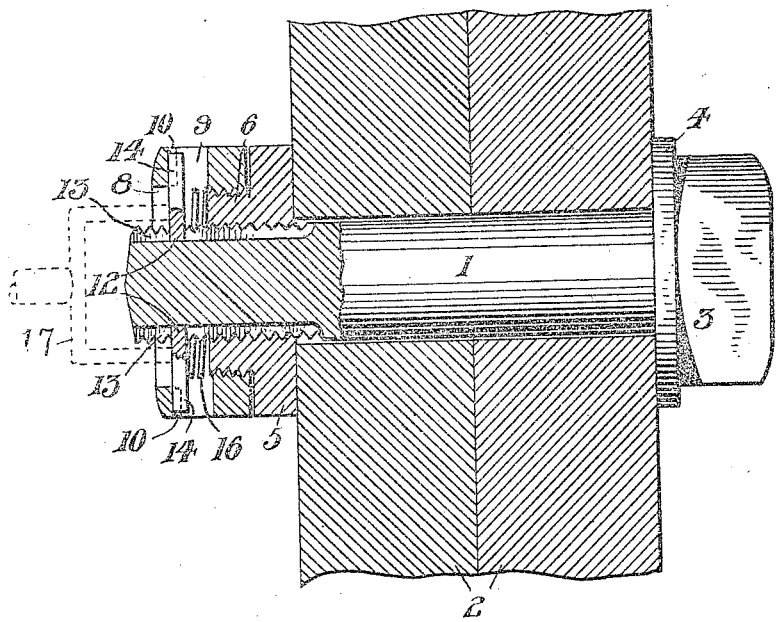
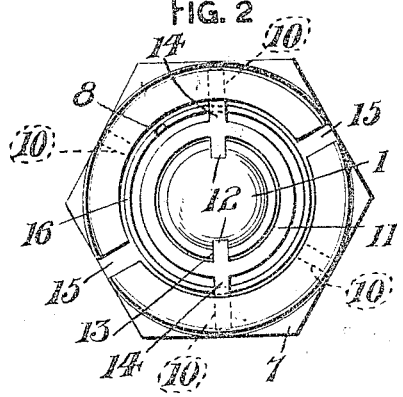
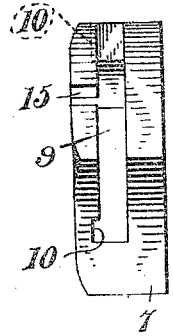
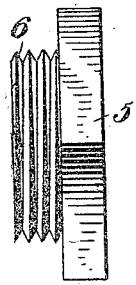
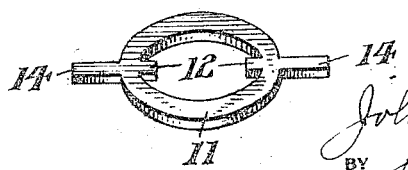
WITNESSES
Elva Staniels
J. S. Mehard
INVENTOR
John Buttner
BY
F. N. Barber
ATTORNEY

UNITED STATES PATENT OFFICE.

JOHN BUTTNER, OF FAYETTE CITY, PENNSYLVANIA.

NUT-LOCK.

1,022,657.  Specification of Letters Patent.  Patented Apr. 9, 1912.

Application filed January 2, 1912. Serial No. 668,811.

*To all whom it may concern:*

Be it known that I, JOHN BUTTNER, a citizen of the United States, residing at Fayette City, in the county of Fayette and State of Pennsylvania, have invented new and useful Improvements in Nut-Locks, of which the following is a specification.

My invention relates to devices for locking nuts to bolts and its object is to provide a device of this character which is cheap, simple and reliable.

Referring to the accompanying sheet of drawing, Figure 1 is a section taken longitudinally of the bolt and showing my invention applied thereto, the bolt being partly in side elevation. Fig. 2 is an end elevation of a bolt with my invention thereon. Fig. 3 is a side view of the locking nut and Fig. 4, a side view of the locked nut. Fig. 5 is a perspective view of the locking catch or dog.

On the drawing, 1 represents a bolt having its body extending through the two pieces of material 2. The head 3 of the bolt bears on the washer 4 which engages the outer face of the right-hand piece 2. The threaded end of the bolt extends beyond the outer face of the left-hand piece 2. The nut 5 is screwed on the threaded end of the bolt and into engagement with the left-hand piece 2. The outer end of the nut 5 is reduced in diameter, as shown at 6, and the reduced end is threaded exteriorly to receive the locking-nut 7 having its inner end interiorly threaded to correspond to the threads on the reduced end or extension 6. The outer portion of the locking-nut has an axial unthreaded opening 8 somewhat larger than the threaded opening at the inner end thereof, the unthreaded opening extending inwardly to the threaded opening. The sides of the locking-nut are provided with the slots or ways 9 extending at right angles with the axis of the bolt and locking-nut and communicating with the opening 8. At each end of each slot or way 9 I provide a notch 10 extending into the outer wall of the same.

I provide a catch or dog for preventing the locking-nut 7 from rotating on the bolt. This catch or dog has the annular body 11 having its internal diameter of a size to allow the body to travel on the threaded end of the bolt and in the opening 8. The body 11 has two inwardly projecting lugs 12 having travel in the longitudinal grooves 13 in the sides of the bolt. The body 11 has also two outwardly-extending lugs or projections 14 which may pass through the slots or passages 15 extending from the outer end of the locking-nut into the central portion of the slots 9.

16 is a coiled spring lying between the bottom of the opening 8 and the body 11 of the catch.

After the nut 5 has been turned down on the adjacent piece 2 the locking-nut 7 is screwed down on the nut 5; or both the nut and the locking nut are screwed down together on the bolt. The locking-nut 7 must stand so that the locking piece or catch can be applied, that is, so that, when the lugs 12 are arranged to travel along the grooves 13, the projections 14 will pass through the slots or passages 15. The spring 16 having been first put into the opening 8, the locking piece is pushed down along the bolt until the projections pass through the passages 15 and into the slots 9, whereupon the nut and the locking-nut are given a partial turn to the right or the left, according as the bolt is right or left threaded, until the spring pushes the projection 14 into a pair of opposite locking notches 10. The method just given will be satisfactory in most cases where the pieces 2 or their equivalent are of wood or other yielding material. When my invention is applied to metal or other material of unyielding nature, the locking-nut alone, or the locking-nut and the nut 5 may have to be slightly turned back before inserting the catch in the locking-nut so that, when the notches 10 are brought opposite the projections 14, both the nuts will be screwed down tight.

To remove the locking-nut, I prefer to use a tool such as shown at 17 to push the catch inwardly so that the projections 14 will be beyond the notches 10, whereupon the nut 7 can be rotated until the projections come opposite the passages 15. The catch may then be readily removed and the nuts turned off the bolt.

In case the pieces 2 shrink or the nut 5 becomes loose for any reason it may be turned tighter without affecting the locking-nut;

but the latter may be readjusted provided it may be advanced a half turn, or the angle between the passages 15.

It is clear that, for some purposes the nuts 5 and 7 may be inseparable or integral.

I claim—

1. In a nut-lock, a threaded bolt, a nut thereon, a locking-nut screwed on the said nut and having an enlarged axial opening therein, a spring in the opening, and a catch non-rotatively connected to the bolt and releasably connected to the locking nut.

2. In a nut-lock, a threaded bolt, a nut thereon, a locking-nut connected to the outer end thereof and having communicating axial and side openings, a catch, non-rotatively connected to the bolt and having its body in the axial opening and locking projections in the side openings, and a spring in the axial opening to force the projections toward the outer walls of the side openings.

3. In a nut-lock, a threaded bolt, a nut thereon, a locking-nut connected to the outer end thereof and having communicating axial and side openings, a catch, non-rotatively connected to the bol and having its body in the axial opening and locking projections in the side openings, and a spring in the axial opening to force the projections toward the outer walls of the side openings, there being recesses in the said wall to receive the said projections.

4. In a nut-lock, a threaded bolt, a nut thereon, a locking-nut connected to the outer end thereof and having communicating axial and side openings, the latter having passages leading outwardly to the end of the locking-nut and notches in their outer walls, a catch non-rotatively connected to the bolt and having projections adapted to pass through the said passages and along the said side openings, and a spring in the axial opening to press the said projections outwardly.

Signed at Fayette City, Pa., this 28th day of December, 1911.

JOHN BUTTNER.

Witnesses:
J. C. CRANSHORE,
A. M. McCRORY.